United States Patent
Herzog

(10) Patent No.: US 8,275,577 B2
(45) Date of Patent: Sep. 25, 2012

(54) KERNEL-BASED METHOD FOR DETECTING BOILER TUBE LEAKS

(75) Inventor: James P. Herzog, Downers Grove, IL (US)

(73) Assignee: SmartSignal Corporation, Lisle, IL (US)

(*) Notice: Subject to any disclaimer, the term of this patent is extended or adjusted under 35 U.S.C. 154(b) by 880 days.

(21) Appl. No.: 11/856,897

(22) Filed: Sep. 18, 2007

(65) Prior Publication Data

US 2008/0071501 A1    Mar. 20, 2008

Related U.S. Application Data

(60) Provisional application No. 60/826,203, filed on Sep. 19, 2006.

(51) Int. Cl.
*G06F 11/30* (2006.01)

(52) U.S. Cl. .......................................... 702/183

(58) Field of Classification Search ............ 702/59, 702/65, 67, 68, 104, 119, 179, 180, 182, 702/183, 188, 189
See application file for complete search history.

(56) References Cited

U.S. PATENT DOCUMENTS

| | | |
|---|---|---|
| 3,045,221 A | 7/1962 | Roop |
| 3,561,237 A | 2/1971 | Eggers |
| 3,651,454 A | 3/1972 | Venema et al. |
| 3,767,900 A | 10/1973 | Chao et al. |
| 3,851,157 A | 11/1974 | Ellis et al. |
| 3,866,166 A | 2/1975 | Kerscher et al. |
| 3,906,437 A | 9/1975 | Brandwein et al. |
| 3,928,022 A | 12/1975 | Langange |
| 3,992,884 A | 11/1976 | Pacault |
| 4,057,847 A | 11/1977 | Lowell et al. |
| 4,060,716 A | 11/1977 | Pekrul et al. |
| 4,067,061 A | 1/1978 | Juhasz |
| 4,071,898 A | 1/1978 | Schorsch et al. |
| 4,080,654 A | 3/1978 | Walley, Jr. |
| 4,212,064 A | 7/1980 | Forsythe et al. |
| 4,215,412 A | 7/1980 | Bernier et al. |
| 4,267,569 A | 5/1981 | Baumann et al. |
| 4,271,402 A | 6/1981 | Kastura et al. |
| 4,295,128 A | 10/1981 | Hashemian et al. |

(Continued)

FOREIGN PATENT DOCUMENTS

EP    0840244    5/1998

(Continued)

OTHER PUBLICATIONS

An International Search Report dated May 8, 2008, from the International Bureau in corresponding International (PCT) Application No. PCT/US07/078906.

(Continued)

*Primary Examiner* — Mohamed Charioui
(74) *Attorney, Agent, or Firm* — GE Global Patent Operation; Catherine J. Toppin

(57) ABSTRACT

A method and apparatus are provided for diagnosing faults in a monitored system that is monitored by sensors. An empirical model is generated for a targeted component of the monitored system. The empirical model is trained with an historical data source that contains example observations of the sensors. Substantially real-time estimates are generated based on instrumented data corresponding to the targeted component. The substantially real-time estimates are compared and differenced with instrumented readings from the sensors to provide residual values. The residual values are analyzed to detect the faults and determine a location of the faults in the monitored system.

36 Claims, 5 Drawing Sheets

U.S. PATENT DOCUMENTS

| | | |
|---|---|---|
| 4,296,409 A | 10/1981 | Whitaker et al. |
| 4,330,838 A | 5/1982 | Yoneda et al. |
| 4,334,136 A | 6/1982 | Mahan et al. |
| 4,336,595 A | 6/1982 | Adams et al. |
| 4,368,510 A | 1/1983 | Anderson |
| 4,398,258 A | 8/1983 | Naitoh et al. |
| 4,402,054 A | 8/1983 | Osborne et al. |
| RE31,582 E | 5/1984 | Hosaka |
| RE31,750 E | 11/1984 | Morrow |
| 4,480,480 A | 11/1984 | Scott et al. |
| 4,517,468 A | 5/1985 | Kemper et al. |
| 4,521,885 A | 6/1985 | Melocik et al. |
| 4,639,882 A | 1/1987 | Keats |
| 4,667,176 A | 5/1987 | Matsuda |
| 4,677,429 A | 6/1987 | Glotzbach |
| 4,707,796 A | 11/1987 | Calabro et al. |
| 4,761,748 A | 8/1988 | Le Rat et al. |
| 4,773,021 A | 9/1988 | Harris et al. |
| 4,796,205 A | 1/1989 | Ishii et al. |
| 4,823,290 A | 4/1989 | Fasack et al. |
| 4,841,456 A | 6/1989 | Hogan, Jr. et al. |
| 4,849,894 A | 7/1989 | Probst |
| 4,924,418 A | 5/1990 | Bachman et al. |
| 4,931,977 A | 6/1990 | Klemes |
| 4,937,763 A | 6/1990 | Mott |
| 4,951,234 A * | 8/1990 | Bellows ..................... 702/183 |
| 4,965,513 A | 10/1990 | Haynes et al. |
| 4,965,549 A | 10/1990 | Koike |
| 4,975,685 A | 12/1990 | Rahhal |
| 4,975,827 A | 12/1990 | Yonezawa |
| 4,978,291 A | 12/1990 | Nakai |
| 4,978,909 A | 12/1990 | Hendrix et al. |
| 4,985,857 A | 1/1991 | Bajpai et al. |
| 4,990,885 A | 2/1991 | Irick et al. |
| 5,003,478 A | 3/1991 | Kobayashi et al. |
| 5,003,479 A | 3/1991 | Kobayashi et al. |
| 5,003,950 A | 4/1991 | Kato et al. |
| 5,005,142 A | 4/1991 | Lipchak et al. |
| 5,005,147 A | 4/1991 | Krishen et al. |
| 5,009,833 A | 4/1991 | Takeuchi et al. |
| 5,010,487 A | 4/1991 | Stonehocker |
| 5,012,414 A | 4/1991 | Ishii et al. |
| 5,012,421 A | 4/1991 | Ishii |
| 5,025,499 A | 6/1991 | Inoue et al. |
| 5,034,889 A | 7/1991 | Abe |
| 5,038,545 A | 8/1991 | Hiendl |
| 5,052,630 A | 10/1991 | Hinsey et al. |
| 5,056,023 A | 10/1991 | Abe |
| 5,063,513 A | 11/1991 | Shank et al. |
| 5,067,099 A | 11/1991 | McCown et al. |
| 5,072,391 A | 12/1991 | Abe |
| 5,088,058 A | 2/1992 | Salsburg |
| 5,091,856 A | 2/1992 | Hasegawa et al. |
| 5,093,792 A | 3/1992 | Taki et al. |
| 5,109,700 A | 5/1992 | Hicho |
| 5,113,483 A | 5/1992 | Keeler et al. |
| 5,119,287 A | 6/1992 | Nakamura et al. |
| 5,119,468 A | 6/1992 | Owens |
| 5,123,017 A | 6/1992 | Simpkins et al. |
| 5,164,895 A | 11/1992 | Lunz et al. |
| 5,166,873 A | 11/1992 | Takatsu et al. |
| 5,173,856 A | 12/1992 | Purnell et al. |
| 5,187,735 A | 2/1993 | Herrero Garcia et al. |
| 5,195,046 A | 3/1993 | Gerardi et al. |
| 5,210,704 A | 5/1993 | Husseiny |
| 5,213,080 A | 5/1993 | Lambert et al. |
| 5,214,582 A | 5/1993 | Gray |
| 5,222,065 A | 6/1993 | Krogmann |
| 5,223,207 A | 6/1993 | Gross et al. |
| 5,239,462 A | 8/1993 | Jones et al. |
| 5,251,285 A | 10/1993 | Inoue et al. |
| 5,255,208 A | 10/1993 | Thakore et al. |
| 5,262,941 A | 11/1993 | Saladin et al. |
| 5,285,494 A | 2/1994 | Sprecher et al. |
| 5,291,420 A | 3/1994 | Matsumoto et al. |
| 5,309,139 A | 5/1994 | Austin |
| 5,309,351 A | 5/1994 | McCain et al. |
| 5,309,379 A | 5/1994 | Rawlings et al. |
| 5,311,562 A | 5/1994 | Palusamy et al. |
| 5,325,304 A | 6/1994 | Aoki |
| 5,327,349 A | 7/1994 | Hoste |
| 5,333,240 A | 7/1994 | Matsumoto et al. |
| 5,361,336 A | 11/1994 | Atchison |
| 5,386,373 A | 1/1995 | Keeler et al. |
| 5,387,783 A | 2/1995 | Mihm et al. |
| 5,390,776 A | 2/1995 | Thompson |
| 5,402,333 A | 3/1995 | Cardner |
| 5,402,521 A | 3/1995 | Niida et al. |
| 5,410,492 A | 4/1995 | Gross et al. |
| 5,414,619 A | 5/1995 | Katayama et al. |
| 5,414,632 A | 5/1995 | Mochizuki et al. |
| 5,420,571 A | 5/1995 | Coleman et al. |
| 5,421,204 A | 6/1995 | Svaty, Jr. |
| 5,442,553 A | 8/1995 | Parrillo |
| 5,445,347 A | 8/1995 | Ng |
| 5,446,671 A | 8/1995 | Weaver et al. |
| 5,446,672 A | 8/1995 | Boldys |
| 5,450,321 A | 9/1995 | Crane |
| 5,450,537 A | 9/1995 | Hirai et al. |
| 5,455,777 A | 10/1995 | Fujiyama et al. |
| 5,459,675 A | 10/1995 | Gross et al. |
| 5,463,768 A | 10/1995 | Cuddihy et al. |
| 5,463,769 A | 10/1995 | Tate et al. |
| 5,465,321 A | 11/1995 | Smyth |
| 5,473,532 A | 12/1995 | Unno et al. |
| 5,479,574 A | 12/1995 | Glier et al. |
| 5,481,647 A | 1/1996 | Brody et al. |
| 5,481,674 A | 1/1996 | Mahavadi |
| 5,486,997 A | 1/1996 | Reismiller et al. |
| 5,495,168 A | 2/1996 | de Vries |
| 5,496,450 A | 3/1996 | Blumenthal et al. |
| 5,500,940 A | 3/1996 | Skeie |
| 5,502,543 A | 3/1996 | Aboujaoude |
| 5,526,446 A | 6/1996 | Adelson et al. |
| 5,539,638 A | 7/1996 | Keeler et al. |
| 5,544,320 A | 8/1996 | Konrad |
| 5,548,528 A | 8/1996 | Keeler et al. |
| 5,553,239 A | 9/1996 | Heath et al. |
| 5,559,710 A | 9/1996 | Shahraray et al. |
| 5,561,431 A | 10/1996 | Peele et al. |
| 5,566,092 A | 10/1996 | Wang et al. |
| 5,574,387 A | 11/1996 | Petsche et al. |
| 5,579,232 A | 11/1996 | Tong et al. |
| 5,586,066 A | 12/1996 | White et al. |
| 5,596,507 A | 1/1997 | Jones et al. |
| 5,600,726 A | 2/1997 | Morgan et al. |
| 5,602,733 A | 2/1997 | Rogers et al. |
| 5,608,845 A | 3/1997 | Ohtsuka et al. |
| 5,610,339 A | 3/1997 | Haseley et al. |
| 5,611,052 A | 3/1997 | Dykstra et al. |
| 5,612,886 A | 3/1997 | Weng |
| 5,617,342 A | 4/1997 | Elazouni |
| 5,623,109 A | 4/1997 | Uchida et al. |
| 5,629,872 A | 5/1997 | Gross et al. |
| 5,629,878 A | 5/1997 | Kobrosly |
| 5,629,879 A | 5/1997 | Lelle |
| 5,638,413 A | 6/1997 | Uematsu et al. |
| 5,640,103 A | 6/1997 | Petsche et al. |
| 5,644,463 A | 7/1997 | El-Sharkawi et al. |
| 5,657,245 A | 8/1997 | Hecht et al. |
| 5,663,894 A | 9/1997 | Seth et al. |
| 5,668,944 A | 9/1997 | Berry |
| 5,671,635 A | 9/1997 | Nadeau et al. |
| 5,680,409 A | 10/1997 | Qin et al. |
| 5,680,541 A | 10/1997 | Kurosu et al. |
| 5,682,317 A | 10/1997 | Keeler et al. |
| 5,689,416 A | 11/1997 | Shimizu et al. |
| 5,689,434 A | 11/1997 | Tambini et al. |
| 5,696,907 A | 12/1997 | Tom |
| 5,699,403 A | 12/1997 | Ronnen |
| 5,704,029 A | 12/1997 | Wright, Jr. |
| 5,708,780 A | 1/1998 | Levergood et al. |
| 5,710,723 A | 1/1998 | Hoth et al. |
| 5,714,683 A | 2/1998 | Maloney |
| 5,727,144 A | 3/1998 | Brady et al. |
| 5,727,163 A | 3/1998 | Bezos |
| 5,737,228 A | 4/1998 | Ishizuka et al. |

| | | | | | | |
|---|---|---|---|---|---|---|
| 5,745,382 A | 4/1998 | Vilim et al. | | 5,995,916 A | 11/1999 | Nixon et al. |
| 5,745,654 A | 4/1998 | Titan | | 5,995,947 A | 11/1999 | Fraser et al. |
| 5,748,496 A | 5/1998 | Takahashi et al. | | 6,000,832 A | 12/1999 | Franklin et al. |
| 5,751,580 A | 5/1998 | Chi | | 6,002,839 A | 12/1999 | Keeler et al. |
| 5,753,805 A | 5/1998 | Maloney | | 6,006,192 A | 12/1999 | Cheng et al. |
| 5,754,451 A | 5/1998 | Williams | | 6,006,260 A | 12/1999 | Barrick, Jr. et al. |
| 5,754,965 A | 5/1998 | Hagenbuch | | 6,009,381 A | 12/1999 | Ono |
| 5,757,309 A | 5/1998 | Brooks et al. | | 6,013,108 A | 1/2000 | Karolys et al. |
| 5,761,090 A | 6/1998 | Gross et al. | | 6,014,598 A | 1/2000 | Duyar et al. |
| 5,761,640 A | 6/1998 | Kalyanswamy et al. | | 6,014,645 A | 1/2000 | Cunningham |
| 5,764,509 A | 6/1998 | Gross et al. | | 6,021,396 A | 2/2000 | Ramaswamy et al. |
| 5,774,379 A | 6/1998 | Gross et al. | | 6,023,507 A | 2/2000 | Wookey |
| 5,774,882 A | 6/1998 | Keen et al. | | 6,026,348 A | 2/2000 | Hala |
| 5,774,883 A | 6/1998 | Andersen et al. | | 6,029,097 A | 2/2000 | Branicky et al. |
| 5,784,285 A | 7/1998 | Tamaki et al. | | 6,029,149 A | 2/2000 | Dykstra et al. |
| 5,787,138 A | 7/1998 | Ocieczek et al. | | 6,029,890 A | 2/2000 | Austin |
| 5,790,977 A | 8/1998 | Ezekiel | | 6,041,287 A | 3/2000 | Dister et al. |
| 5,791,147 A * | 8/1998 | Earley et al. ............... 60/646 | | 6,049,738 A | 4/2000 | Kayama et al. |
| 5,792,072 A | 8/1998 | Keefe | | 6,049,741 A | 4/2000 | Kawamura |
| 5,796,633 A | 8/1998 | Burgess et al. | | 6,049,827 A | 4/2000 | Sugauchi et al. |
| 5,797,133 A | 8/1998 | Jones et al. | | 6,064,916 A | 5/2000 | Yoon |
| 5,799,043 A | 8/1998 | Chang et al. | | 6,076,048 A | 6/2000 | Gunther et al. |
| 5,802,509 A | 9/1998 | Maeda et al. | | 6,076,088 A | 6/2000 | Paik et al. |
| 5,805,442 A | 9/1998 | Crater et al. | | 6,088,626 A | 7/2000 | Lilly et al. |
| 5,808,903 A | 9/1998 | Schiltz et al. | | 6,088,686 A | 7/2000 | Walker et al. |
| 5,809,490 A | 9/1998 | Guiver et al. | | 6,100,901 A | 8/2000 | Mohda et al. |
| 5,817,958 A | 10/1998 | Uchida et al. | | 6,104,965 A | 8/2000 | Lim et al. |
| 5,818,716 A | 10/1998 | Chin et al. | | 6,105,007 A | 8/2000 | Norris |
| 5,819,029 A | 10/1998 | Edwards et al. | | 6,107,919 A | 8/2000 | Wilks et al. |
| 5,819,236 A | 10/1998 | Josephson | | 6,108,616 A | 8/2000 | Borchers et al. |
| 5,819,291 A | 10/1998 | Haimowitz et al. | | 6,110,214 A | 8/2000 | Klimasauskas |
| 5,822,212 A | 10/1998 | Tanaka et al. | | 6,112,190 A | 8/2000 | Fletcher et al. |
| 5,832,465 A | 11/1998 | Tom | | 6,115,653 A | 9/2000 | Bergstrom et al. |
| 5,841,677 A | 11/1998 | Yang et al. | | 6,119,111 A | 9/2000 | Gross et al. |
| 5,842,157 A | 11/1998 | Wehhofer et al. | | 6,125,351 A | 9/2000 | Kauffman |
| 5,845,230 A | 12/1998 | Lamberson | | 6,128,540 A | 10/2000 | Van Der Vegt et al. |
| 5,845,627 A | 12/1998 | Olin et al. | | 6,128,543 A | 10/2000 | Hitchner |
| 5,848,396 A | 12/1998 | Gerace | | 6,131,076 A | 10/2000 | Stephan et al. |
| 5,864,773 A | 1/1999 | Barna et al. | | 6,141,647 A | 10/2000 | Meijer et al. |
| 5,867,118 A | 2/1999 | McCoy et al. | | 6,141,674 A | 10/2000 | Unkrich et al. |
| 5,870,721 A | 2/1999 | Norris | | 6,144,893 A | 11/2000 | Van Der Vegt et al. |
| 5,878,403 A | 3/1999 | DeFrancesco et al. | | 6,181,975 B1 | 1/2001 | Gross et al. |
| 5,886,913 A | 3/1999 | Marguinaud et al. | | 6,182,022 B1 | 1/2001 | Mayle et al. |
| 5,895,177 A | 4/1999 | Iwai et al. | | 6,202,038 B1 | 3/2001 | Wegerich et al. |
| 5,905,989 A | 5/1999 | Biggs | | 6,236,908 B1 | 5/2001 | Cheng et al. |
| 5,909,368 A | 6/1999 | Nixon et al. | | 6,240,372 B1 | 5/2001 | Gross et al. |
| 5,911,135 A | 6/1999 | Atkins | | 6,245,517 B1 | 6/2001 | Chen et al. |
| 5,913,911 A | 6/1999 | Beck et al. | | 6,246,972 B1 | 6/2001 | Klimasauskas |
| 5,917,428 A | 6/1999 | Discenzo et al. | | 6,272,449 B1 | 8/2001 | Passera |
| 5,921,099 A | 7/1999 | Lee | | 6,278,962 B1 | 8/2001 | Klimasauskas et al. |
| 5,930,156 A | 7/1999 | Kennedy | | 6,289,330 B1 | 9/2001 | Jannarone |
| 5,930,776 A | 7/1999 | Dykstra et al. | | 6,327,574 B1 | 12/2001 | Kramer et al. |
| 5,930,779 A | 7/1999 | Knoblock et al. | | 6,331,864 B1 | 12/2001 | Coco et al. |
| 5,933,352 A | 8/1999 | Salut | | 6,331,964 B1 | 12/2001 | Barone |
| 5,933,818 A | 8/1999 | Kasravi et al. | | 6,356,857 B1 | 3/2002 | Qin et al. |
| 5,940,298 A | 8/1999 | Pan et al. | | 6,393,373 B1 | 5/2002 | Duyar et al. |
| 5,940,811 A | 8/1999 | Norris | | 6,418,431 B1 | 7/2002 | Mahajan et al. |
| 5,940,812 A | 8/1999 | Tengel et al. | | 6,424,958 B1 | 7/2002 | Pappalardo et al. |
| 5,943,634 A | 8/1999 | Piety et al. | | 6,480,810 B1 | 11/2002 | Cardella et al. |
| 5,946,661 A | 8/1999 | Rothschild et al. | | 6,502,082 B1 | 12/2002 | Toyama et al. |
| 5,946,662 A | 8/1999 | Ettl et al. | | 6,519,552 B1 | 2/2003 | Sampath et al. |
| 5,949,678 A | 9/1999 | Wold et al. | | 6,522,978 B1 | 2/2003 | Chen et al. |
| 5,950,147 A | 9/1999 | Sarangapani et al. | | 6,526,356 B1 | 2/2003 | DiMaggio et al. |
| 5,950,179 A | 9/1999 | Buchanan et al. | | 6,532,426 B1 | 3/2003 | Hooks et al. |
| 5,956,487 A | 9/1999 | Venkatraman et al. | | 6,539,343 B2 | 3/2003 | Zhao et al. |
| 5,956,664 A | 9/1999 | Bryan | | 6,553,334 B2 | 4/2003 | Gross et al. |
| 5,960,411 A | 9/1999 | Hartman et al. | | 6,556,939 B1 | 4/2003 | Wegerich |
| 5,960,435 A | 9/1999 | Rathmann et al. | | 6,567,752 B2 | 5/2003 | Cusumano et al. |
| 5,961,560 A | 10/1999 | Kemner | | 6,567,795 B2 | 5/2003 | Alouani et al. |
| 5,963,884 A | 10/1999 | Billington et al. | | 6,587,737 B2 | 7/2003 | Voser et al. |
| 5,966,699 A | 10/1999 | Zandi | | 6,590,362 B2 | 7/2003 | Parlos et al. |
| 5,970,430 A | 10/1999 | Burns et al. | | 6,591,166 B1 | 7/2003 | Millett et al. |
| 5,970,478 A | 10/1999 | Walker et al. | | 6,591,296 B1 | 7/2003 | Ghanime |
| 5,987,399 A | 11/1999 | Wegerich et al. | | 6,609,036 B1 | 8/2003 | Bickford |
| 5,987,434 A | 11/1999 | Libman | | 6,609,212 B1 | 8/2003 | Smith |
| 5,991,525 A | 11/1999 | Shah et al. | | 6,625,569 B2 | 9/2003 | James et al. |
| 5,991,735 A | 11/1999 | Gerace | | 6,651,035 B1 * | 11/2003 | Lang ............... 702/183 |
| 5,993,041 A | 11/1999 | Toba | | 6,678,639 B2 | 1/2004 | Little et al. |
| 5,995,911 A | 11/1999 | Hart | | 6,687,654 B2 | 2/2004 | Smith, Jr. et al. |

| | | | |
|---|---|---|---|
| 6,731,990 B1 | 5/2004 | Carter et al. | |
| 6,751,575 B2 | 6/2004 | Lenz et al. | |
| 6,775,641 B2 | 8/2004 | Wegerich et al. | |
| 6,804,628 B2 | 10/2004 | Gross et al. | |
| 6,826,552 B1 | 11/2004 | Grosser et al. | |
| 6,839,660 B2 | 1/2005 | Eryurek et al. | |
| 6,853,920 B2 | 2/2005 | Hsiung et al. | |
| 6,859,739 B2 | 2/2005 | Wegerich et al. | |
| 6,876,943 B2 | 4/2005 | Wegerich | |
| 6,892,163 B1 | 5/2005 | Herzog et al. | |
| 6,898,469 B2 | 5/2005 | Bickford | |
| 6,898,554 B2 | 5/2005 | Jaw et al. | |
| 6,917,839 B2 | 7/2005 | Bickford | |
| 6,941,287 B1 | 9/2005 | Vaidyanathan et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 6,999,899 B2 | 2/2006 | Gross et al. | |
| 7,016,816 B2 | 3/2006 | Mott | |
| 7,027,953 B2 | 4/2006 | Klein | |
| 7,050,875 B2 | 5/2006 | Cribbs et al. | |
| 7,085,675 B2 | 8/2006 | Wegerich | |
| 7,089,154 B2 | 8/2006 | Rasmussen et al. | |
| 7,142,990 B2 | 11/2006 | Bouse et al. | |
| 7,233,886 B2 | 6/2007 | Wegerich et al. | |
| 7,308,385 B2 | 12/2007 | Wegerich et al. | |
| 7,373,283 B2 | 5/2008 | Herzog et al. | |
| 7,386,426 B1 | 6/2008 | Black et al. | |
| 7,403,869 B2 | 7/2008 | Wegerich et al. | |
| 7,409,320 B2 | 8/2008 | Wegerich | |
| 7,539,597 B2 | 5/2009 | Wegerich et al. | |
| 7,621,141 B2 | 11/2009 | McCormick et al. | |
| 7,640,145 B2 | 12/2009 | Wegerich et al. | |
| 7,739,096 B2 | 6/2010 | Wegerich et al. | |
| 7,941,701 B2 | 5/2011 | Wegerich et al. | |
| 2002/0065698 A1 | 5/2002 | Schick | |
| 2002/0152056 A1* | 10/2002 | Herzog et al. | 703/2 |
| 2002/0183971 A1* | 12/2002 | Wegerich et al. | 702/185 |
| 2003/0028269 A1 | 2/2003 | Spriggs | |
| 2003/0040878 A1 | 2/2003 | Rasmussen | |
| 2003/0055666 A1 | 3/2003 | Roddy | |
| 2003/0060808 A1 | 3/2003 | Wilk | |
| 2003/0093521 A1 | 5/2003 | Schlonski | |
| 2003/0109951 A1 | 6/2003 | Hsiung | |
| 2003/0125248 A1 | 7/2003 | Hair | |
| 2003/0126258 A1 | 7/2003 | Conkright | |
| 2004/0019406 A1 | 1/2004 | Wang | |
| 2004/0088093 A1 | 5/2004 | Yao | |
| 2004/0243636 A1* | 12/2004 | Hasiewicz et al. | 707/104.1 |
| 2005/0021187 A1 | 1/2005 | Wang | |
| 2005/0021212 A1 | 1/2005 | Gayme et al. | |
| 2005/0027400 A1 | 2/2005 | Wang | |
| 2005/0096757 A1* | 5/2005 | Frerichs et al. | 700/21 |
| 2005/0210337 A1 | 9/2005 | Chester | |
| 2005/0261837 A1 | 11/2005 | Wegerich | |
| 2008/0071501 A1 | 3/2008 | Herzog | |
| 2008/0183425 A1 | 7/2008 | Hines | |
| 2008/0215291 A1 | 9/2008 | Wegerich | |
| 2009/0043405 A1 | 2/2009 | Chester | |
| 2009/0043467 A1 | 2/2009 | Filev | |

FOREIGN PATENT DOCUMENTS

| | | |
|---|---|---|
| JP | 61160111 | 7/1986 |
| JP | 02004300 | 9/1990 |
| JP | 05126980 | 5/1993 |
| JP | 06274784 | 9/1994 |
| JP | 06278179 | 10/1994 |
| JP | 7243876 | 9/1995 |
| JP | 08220279 | 8/1996 |
| JP | 09166483 | 6/1997 |
| JP | 11311591 | 9/1999 |
| JP | 06161982 | 6/2006 |
| WO | 9016048 | 12/1990 |
| WO | WO9504878 | 2/1995 |
| WO | WO9722073 | 6/1997 |
| WO | WO0067412 | 11/2000 |
| WO | WO0167262 | 9/2001 |
| WO | WO0235299 | 5/2002 |
| WO | WO02057856 | 7/2002 |
| WO | WO02086726 | 10/2002 |
| WO | WO2005038545 | 4/2005 |

OTHER PUBLICATIONS

Black et al., System Modeling and Instrument Calibration Verification with a Nonlinear State Estimation Technique, Maintenance and Reliability Conference Proceedings, May 12-14, 1998, pp. 58.01-58.15, vol. 2 of 2, MARCON 98, Knoxville, Tennessee.

Black, Chris L., J. Wesley Hines, and Robert E. Uhlrig, Online Implementation of Instrument Surveillance and Calibration Verification Using Autoassociative Neural Networks, published in the proceedings of Maintenance and Reliability Conference (MARCON 97), May 20-22, 1997.

Caldwel et al—"Remote Instrument Diagnosis on the Internet," IEEE Intelligent Systems, vol. 13, No. 3, pp. 70-76, May-Jun. 1998.

Garvey, Dustin R., Hines, J Wesley, "Robust Distance Measures for On-Line Monitoring: Why Use Euclidean," 7th International Fuzzy Logic and Intelligent Technologies in Nuclear Science (FLINS) Conference on Applied Artificial Intelligence, Aug. 2006, 8 pages, Genova; Italy.

Griebenow et al. "Applied Pattern Recognition for Plant Monitoring and Data Validation." Presented at the Fifth International Joint ISA POWID/EPRI Controls and Instrumentation Conference, La Jolla, California, Jun. 19-21, 1995. (11 pp.).

Gross, K.C., et al, "Sequential Probability Ratio Test for Nuclear Plant Component Surveillance", Nuclear Technology, vol. 93, p. 131, Feb. 1991.

Gross, K.C., R.M. Singer, S.W. Wegerich, J.P. Herzog, R. VanAlstine, and F. Bockhorst, "Application of a Model-based Fault Detection System to Nuclear Plant Signals", presented at the International Conference on Intelligent System Application to Power Systems (ISAP '97), Jul. 6-10, 1997, Seoul, Korea (pp. 66-70).

Herzog, J. P., Y. Yue, and R. L. Bickford, "Dynamics Sensor Validation for Reusable Launch Vehicle Propulsion", presented at the 34th AIAA/ASME/SAE/ASEE Joint Propulsion Conference & Exhibit, Cleveland, Ohio, Jul. 13-15, 1998, AIAA-98-3604 (12 pp.).

Herzog, S. W. Wegerich, K. C. Gross, and F. K. Bockhorst, "MSET Modeling of Crystal River-3 Venturi Flow Meters", 6th International Conference on Nuclear Engineering, ICONE-6169, May 10-14, 1998, Copyright. 1998 ASME (12 pp).

Hines et al., "Plant Wide Sensor Calibration Monitoring", Proceedings of the 1996 IEEE International Symposium on Intelligent Control, Sep. 1996, pp. 378-383.

Hines, J. Wesley, and Garvey, Dustin, "An Autoassociative Empirical Modeling Toolbox for On-Line Monitoring," 18th International Congress and Exhibition on Condition Monitoring and Diagnostic Engineering Management, Aug. 2005, 9 pages, Cranfield, Bedfordshire, United Kingdom.

Hines, J.W. Seibert, R., "Technical Review of On-Line Monitoring Techniques for Performance Assessment," publication prepared for the Division of Engineering Technology, Office of the Nuclear Regulatory Commission, Jan. 2006, pp. 1-127, Washington D.C.

Lehoczky, J.P.,"Real-time queueing network Theory"; Real-Time Systems Symposium, 1997. Proceedings., The 18th IEEE, Dec. 2-5, 1997 pp. 58-67 [retrieved from IEEE database on May 14, 2009].

Mott, J. E., R. W. King, L. R. Monson, D. L. Olson, and J. D. Staffon, "A Universal, Fault-Tolerant, Non-Linear Analytic Network for Modeling and Fault Detection," Proceedings of the 8th Power Plant dynamics, Control & Testing Symposium, Knoxville, Tennessee, May 27-29, 1992 (14pp.).

Singer, Ralph M., Kenny C. Gross, and Stephan Wegerinch,"A Fault-Tolerant Sensory Diagnostic System for Intelligent Vehicle Application" by, presented at the IEEE International Symposium on Intelligent Vehicles, Detroit, MI, Sep. 25-26, 1995 (7pp.).

SmartSignal web page downloaded from http://web.archive.org/web/19990209022642/http://www.smartsignal.com on May 5, 2010.

SmartSignal, trademark with text Feb. 1999, p. 1-16.

Wegerich. S.W. et al. Nonparametric Modeling of Vibration Signal Features for Equipment Health Monitoring, 2003 IEEE Aerospace Conference, Mar. 2003, vol. 7, pp. 3113-3121.

Abstract of paper entitled Analytical Enhancements of Automotive Sensory System Reliability, publicly available before Apr. 30, 1998.

Aynur A. Dayanik et al., Binning: Coverting Numerical Classification into Text Classification, Jun. 2000, Seventeenth International Conference on Machine Learning, eight unnumbered pages.

B.R. Upadhyaya et al.; "An Integrated Approach for Sensor Failure Detection in Dynamic Processes"; Mar. 1987.

Cavallo, A., De Maria, G., Leccia, E., and Setola, R., "Robust Vibration Control of a DC9 Aircraft Frame," Proceedings of the 37th IEEE, Conference on Decision and Control, Dec. 1998, pp. 4039-4044, Tampa, Florida.

Chen Chi-hau; "Statistical Pattern Recognition", 1973, Spartan Books.

D. Psaltis et al., "A multilayered neural network controller", 1988, IEEE Control Systems Magazine, vol. 8, issue 2, pp. 17-21.

D.J. Smith, "Integrating Power Plant Controls Increases Availability and Reduces Costs," Power Engineering, vol. 98, No. 9,pp. 25-29, Sep. 1994. (bibliographic citation and Abstract, pp. 11-12 of DIALOG File 2:INSPEC report).

David B. Skalak, "Prototype and Feature Selection by Sampling and Random Mutation Hill Climbing Algorithms", 1994, International Conference on Machine Learning, nine unnumbered pages.

David B. Skalak, "Prototype Selection for Composite Nearest Neighbor Classifiers", May 1997, University of Massachusetts Amherst, pp. 1-259.

David M.J. Tax and Robert P.W. Duin, "Support vector domain description", 1999, Pattern Recognition Letters, vol. 20, pp. 1191-1199.

Dreze, X. Zufryden, F., Testing Web Site Design and Promotional Content, Journal of Advertising Research, 1997, vol. 37; No. 2, pp. 77-91.

Early Detection of Signel or Process Variation in the Co-Generational Plant at US Steel Gary Works by Neiman et al; Aug. 19, 2004, pp. 8.

F. Hussain et al., "Discretization: An Enabling Technique", Jun. 1999, The National University of Singapore, pp. 1-27.

Freund, Rudolf J.; Wilson, William J.; "Statistical Methods", 1993, Academic Press.

Goodwin, G; "Evaluating the Performance of Virtual Sensors"; Proceedings Information, Decision and Control 1999; Feb. 8-10, 1999; pp. 5-12.

H.R. DePold and F.D. Gass, "The Application of Expert Systems and Neural Networks to Gas Turbine Prognostics and Diagnostics," Transactions of the ASME, Journal of Engineering for Gas Turbines and Power, vol. 121, No. 4, pp. 607-612, Oct. 1999. (Bibliographic citation and Abstract, pp. 7-8 of DIALOG(R) File 2: INSPEC report).

Hansen ,E.J., and M.B. Caudill, "Similarity Based Regression: Applied Advanced Pattern Recognition for Power Plant Analysis," presented at the 1994 EPRI Heat Rate Improvement Conference (9pp.).

Harris, T.J., et al."Empirical Models for Intelligent Data Validation", Instrumentation, Controls, and Automation in the Power Industry; Proceedings of the . . . Power Instrumentation Symposium, Jun. 1992 vol. 35 (pp. 311-326).

Himmelblau et al., "On-Line Sensor Validation of Single Sensors Using Artifical Neural Networks"; Proceedings of the American Control Conference, Jun. 1995, pp. 766-770.

http://mathworld.wolfram.com/DistributionFunction.html.

Humenik, K., and K. C. Gross "Using Fourier Series Methods to Reduce Correlation of Nuclear Power Reactor Data", Nuclear Science and Engineering, vol. 112, Oct. 1992, pp. 127-135.

Humenik, K., et al, "Sequential Probability Ratio Tests for Reactor Signal Validation and Sensor Surveillance Applications", Nuclear Science and Engineering, vol. 105, Aug. 1990, pp. 383-390.

J.A. Walkensteubm W.B. Pardo, H.S. Robertson, and M. Monti, "An Inexpensive Hybrid Video Imaging System," Review of Scientific Instruments, vol. 66, No. 11, pp. 5385-5386, Nov. 1995. (bibliographic citation and Abstract, pp. 10-11 of DIALOG(R) File 2:INSPEC report).

Jain, A. K.; Murty M. N.; Flynn, P. J.; "Data Clustering: A Review", ACM Computing Surveys, vol. 31, No. 3, Sep. 1999.

James Doughtery et al., "Supervised and Unsupervised Discretization of Continuous Features", 1995, in "Machine Learning: Proceedings of the Twelfth International Conference" ed. Armand Prieditis and Stuart Russell, Morgan Kaufmann Publishers, nine unnumbered pages.

Jaw, L.C. et al., Anomaly Detection and Reasoning with Embedded Physical Model. IEEE 2002 Aerospace Conference. Mar. 2002, vol. 6, pp. 3073-3081.

Kah-Kay Sung et al., "Example-Base Learning for View-Based Human Face Detection", 1998, IEEE Transactions on Pattern Analysis and Machine Intelligence, vol. 20, No. 1, pp. 39-51.

Keller, May 1994, "Three Neural Network Based, Sensor Systems for Environmental Monitoring", p. 377-382.

Kim , Y. , et al."Analysis and Processing of Shaft Angular Velocity Signals in Rotating Machinery for Diagnostic Applications," by Y. Kim, et al., IEEE Intl. Conf. on Acoustics, Speech, and Signal Processing, 1995 (vol. 5, pp. 2971-2974.).

Kris Popat and Rosalind W. Picard, "Cluster-Based Probability Model and Its Application to Image and Texture Processing", Feb. 1997, IEEE Transactions on Image Processing, vol. 6, No. 2, pp. 268-284.

Long, T; Hanzevack, E; Bynum, W; "Sensor Fusion and Failure Detection Using Virtual Sensors"; Proceedings of the 1999 American Control Conference; vol. 4; Jun. 1999, pp. 2417-2421.

M. Feridun, "Diagnosis of Connectivity Problems in the Internet," Integrated Network Management, II. Proceedings of the IFIP TC6/WG6 Second International Symposium, pp. 691-701, 1991. (bibliographic citation and Abstract, pp. 12-13 DIALOG(R) File 2:INSPEC report).

M. Furuya, T. Fukumoto, and T. Sekozawa, "WWW-Browser-Based Monitoring System for Industrial Plants," Conference of the IEEE Industrial Electronics Society, Part vol. 3, pp. 1146-1141, 1999. (Bibliographic citation and Abstract. 2-3 of Dialog(R) File 2:INSPEC report).

M. Tarsala, "H-P Computers Will Fix Themselves," CBS MarketWatch.com, Jan. 18, 2000, two pages from the Internet discussing Hewlett-Packard's plan for remote Internet access to diagnose and fix problems.

Maloney, Peter., and Peter M. Olin,"Pnematic and Thermal State Estimators for Production Engine Control and Diagnostics" by SAE Technical Paper Series 980517. International Congress and Exposition, Feb. 23-26, 1998, Copyright 1998 Society of Automotive Engineers, Inc. (ISSN 0148-7191).

Miron et al., "Fault-Tolerance Improvement for a MSET Model of the Crystal River-3 Feedwater Flow System", 1998 IEEE Nuclear Science Symposium, Nov. 1998, pp. 993-994.

ModelWare, TM. Product Review by Robert D. Flori, reprinted from Computerized Investing, Sep./Oct. 1992, vol. XI, No. 5, copyright by The American Association of Individual Investors (pp. 8-10).

Nieman et al—Early Detection of Signal or Process Variation in the Co-Generation Plant at US Steel, Gary Works, pp. 8, 2004.

Olivier Chapelle et al., "Support Vector Machines for Histogram-Based Image Classification", Sep. 1999, IEEE Transactions on Neural Networks, vol. 10, No. 5, pp. 1055-1064.

Orsagh, Rolf et al., "An Internet-based machinery Health Monitoring System," MFPT Committee Meeting, Virginia Beach, VA, May 2000.

O'Sullivan, Paul J. , "Application of a New Technique for Modeling System Behavior", presented at the ISA Symposium, Edmonton, Alberta, May 1, 1991, .COPYRGT. Copyright 1991 Instrument Society of America (21 pp.).

Performance Consulting Services, "ACM Workstation User's Guide", Version 2001, Incorporated, Copyright 1994-2001.

R.A. Errath amd J.J. Dominguez, "Remote Drive Condition Monitoring." 1999 IEEE/-IAS/PCA Cement Industry Technical Conference, pp. 31-48, 1999. (Bibliographic citation and Abstract, pp. DIALOG(R) File 2: INSPEC report).

Rajan et al. Jan. 1998; "Machine Learning Algorithm for Fault Diagnosis in Analog Circuits", p. 1874-1879.

Robertson, Douglas Galen, Ph.D., "Development and statistical interpretation of tools for nonlinear estimation," Auburn University, 1996, 116 pages; AAT 9700752.

Rubinstein, Reuven Y.; "Simulation and the Monte Carlo Method", 1981, John Wiley & Sons.

Rudolph J. Freud and William J. Wilson, Statistical Methods, 1993, Academic Press, pp. 8-15 and 574-575.

S.J. Julier and J.K. Uhlmann, A New Extension of the Kalman Filter to Nonlinear Systems, In: Proc. AeroSense: The 11th International Symposium on Aerospace/Defence Sensing, Simulation and Controls (1997).

Sairam Valluri et al., Nonlinear State Estimation in the Presence of Multiple Steady States, Ind. Eng. Chem. Res. 1996. 35, 2645-2659.

Satnam Alag and Alice M. Agogino, "Intelligent Sensor Validation for On-Line Process Monitoring Diagnosis and Control", Final Report 1993-94.

Shankar, R., "On-Line Monitoring of Instrument Channel Performace," EPRI Technical Report (TR) 104965-R1, Sep. 2000, pp. 1-268, Palo Alto, California.

Smith. J. Using Data Mining for Plant Maintenance. Plant Engineering. Dec. 2002, vol. 56, No. 12, pp. 26-30.

Sowizral, H; "Virtual Sensors"; Proceedings SPIE International Society for Optical Engineering; vol. 2409; Feb. 7-9, 1995; pp. 246-254.

Spatial Tech 2004 "For the First Time, Oil and Gas Lease Site Operators Will be Notified of Equipment Problems Before Costly Shutdowns" Dec. 2000, p, 1-3.

Spoelder, H; "Virtual Instrumentation and Virtual Environments" IEEE Instrumentation and Measurement Magazine; vol. 2, Issue 3; Sep. 1999; pp. 14-19.

Tarassenko L. et al. Novelty Detection in Jet Engines. IEE Colloquium on Condition Monitoring Machinery, External Structures and Health. Apr. 1999, pp. 4/1-4/5.

Tatiraju et al—Multi-Rate Nonlinear State and Parameter Estimation in a Bioreactor, 11pgs, 1998.

Teranet IA Incorporated, "ModelWare.TM. User's Manual", Copyright 1992.

Tucker, Ken "Modelware a New Approach to Prediction" Vendor's Forum, Jan./Feb. 1993 (pp. 14-15, 30).

Understanding Electronic Commerce, David Kosiur, 1997, Microsoft Press, a Division of Microsoft Corporation.

Wilks et al—Monitoring your Equipment by Wilks et al pp. 14, 2004.

Wilson, D. Randall, et al., "Reduction Techniques for Instance-Based Learning Algorithms", Mar. 2000, Machine Learning, vol. 38, No. 3. pp, 1-32.

Wong, Man To: Geva, S.; Orlowski, M.; "Pattern recognition from neural network with functional dependency preprocessing", 1997, Proceedings of IEEE Speech and Technologies for Computing and Telecommunications.

* cited by examiner

KERNEL-BASED METHOD FOR DETECTING BOILER TUBE LEAKS

RELATED APPLICATION DATA

This application claims priority to provisional application Ser. No. 60/826,203, filed Sep. 19, 2006, the disclosure of which is hereby incorporated by reference herein in its entirety.

BACKGROUND OF THE INVENTION

The large heat exchangers used by commercial coal-fired power plants are prone to tube leaks. Tube leaks represent a potential for serious physical damage due to escalation of the original leaks. For instance, the steam tubes located in the superheat/reheat section of a boiler are prone to cascading tube failures due to the close proximity of the steam tubes coupled with the high energy of the escaping steam. When undetected for an extended time, the ultimate damage from serious tube failures may range from $2 to $10 million/leak, forcing the system down for major repairs that can last up to a week.

If detected early, tube failures may be repaired before catastrophic damage, such repairs lasting only several days and costing a fraction of the cost associated with late detection and catastrophic damage. Repair times may be further reduced if the location of the leak is identified before repairs are initiated. In addition, accurate location allows the operator to delay shutdown and repair of leaks that occur in less critical regions of the boiler, such as the water wall, until economically advantageous.

Boiler tube leaks result in the diversion of water from its normal flow paths as the coolant in the boiler, directly into the combustion environment. The amount of water typically diverted by a leak is small relative to the normal variations in feed water flow rates and sources of water in the fuel/air mixture. Other sources of water in the fuel/air mixture are myriad and subtle including: water added at the point of combustion as steam used to atomize fuel; water used by pollutant control processes; water used in soot blowing; water formed from the combustion of hydrocarbon fuels; free water born by the fuel; and moisture carried by combustion air. These confound the discrimination of boiler tube leaks by a variety of prior art methods that have been employed in an attempt to detect them. In addition, the normal operation of the plant is subject to seasonal variation, variation in the quality of the combustion fuel, and manual operator choices, making it extremely difficult to detect boiler tube leaks in their incipient stages.

A system and method has been proposed in U.S. patent application publication No. 2005/0096757 for detecting faults in components of a continuous process, such as a boiler. A model of the process is developed using a modeling technique such as an advanced pattern recognition empirical model, which is used to generate predicted values for a predetermined number of the operating parameters of the process. The operating parameters in the model are drawn from the sensors that monitor the flow of steam/water through the balance-of-plant ("BOP"). The BOP encompasses the components of a power plant that extract thermal energy from the steam/water mixture and convert it to electrical energy. As such, the BOP excludes the boiler itself. The model monitors flow rates of steam/water entering into and exiting from the BOP, which correspond to the flow rate of superheated steam from the top of the boiler and the flow rate of condensed feed water into the bottom of the boiler, respectively. Under normal conditions, the flow entering the BOP is balanced by the flow exiting the BOP. One of the abnormal conditions that can upset this balance is a boiler tube leak. This approach, built around a mass and energy balance on the BOP, is capable of indirectly detecting a boiler tube leak. But since the model does not monitor any operating parameter internal to the boiler, including any parameter from the fuel/air side if the boiler, it is incapable of locating a tube leak.

What is needed is a way of monitoring a heat exchange environment in a fossil fuel power plant that is sensitive enough to detect boiler tube leaks in their initial stages from existing instrumentation present in the plant.

SUMMARY OF THE INVENTION

A method and system for monitoring the heat exchanger of a fossil fueled power plant environment is provided for detection of boiler tube leaks. According to the invention, a multivariate empirical model is generated from data from instrumentation on and related to the boiler, which then provides in real-time or near-real-time estimates for these sensors responsive to receiving each current set of readings from the sensors. The estimates and the actual readings are then compared and differenced to provide residuals that are analyzed for indications of boiler tube leaks. The model is provided by a kernel-based method that learns from example observations of the sensors, and preferably has the ability to localize on relevant learned examples in a two-step estimation process. Finally, the model is preferably capable of lagging-window adaptation to learn new normal variation patterns in plant operation. When kernel-based localized modeling is used to construct a multivariate nonparametric model of the traditional monitoring sensors (pressures, temperatures, flow rates, etc.) present in the boiler, the effect of the normal variations in the water balance on sensor response that typically confound other methods, can be accurately accounted for.

The invention can be carried out as software with access to plant data in data historians, or even from sensor data directly from the control system. The invention can be executed at real-time or near real-time, or can be executed in a batch mode with a batch delay no longer than the time in which the plant operator desires to receive an indication of a boiler tube leak.

The above summary of the present invention is not intended to represent each embodiment or every aspect of the present invention. The detailed description and Figures will describe many of the embodiments and aspects of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

Some embodiments described herein are directed to a boiler in a fossil fuel power plant. However, those skilled in the art will recognize that teachings are equally applicable to a steam generator of a nuclear power plant.

Figure 1:
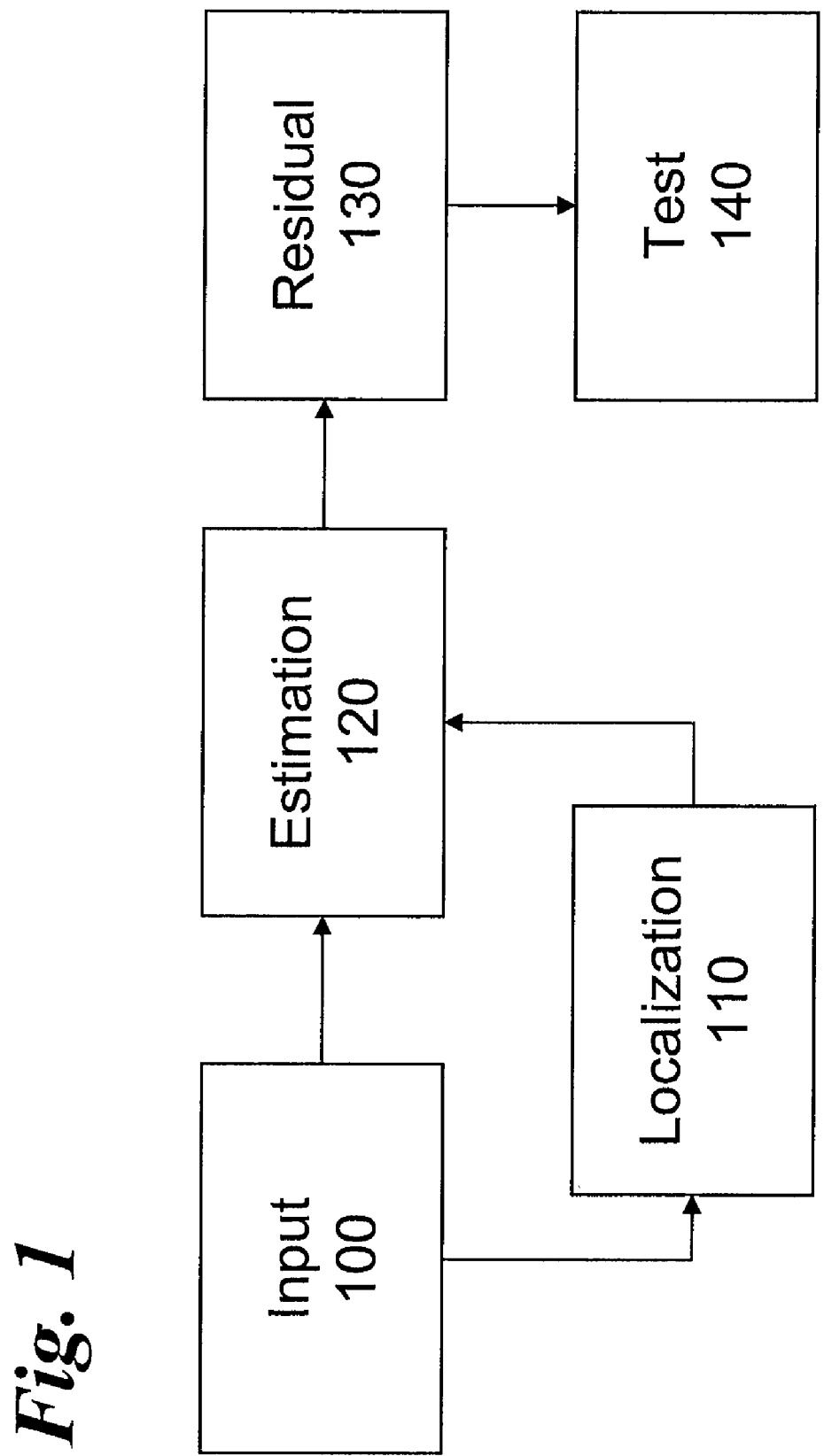
FIG. 1 is process flowchart for boiler tube leak monitoring using the approach of the invention.

Turning to FIG. 1, the method of the present invention is shown to comprise the step 100 of receiving an input observation of the sensor values related to the boiler, and inputting that to a localization step 110. In the localization step, the empirical model is tuned to use data that is "local" or particularly relevant to the input observation. Upon localization tuning of the model, the input observation is then used by the model with its localized learned data, to generate in step 120 an estimate of the input observation. In step 130, the estimate is compared to the input observation to form a residual for each sensor of interest in the input observation. In step 140, the residual signals are tested against pattern matching rules to determine whether any of them indicate a tube leak disturbance, and if so where the disturbance is located within the boiler.

Training of the model or models on sufficient historic data to characterize normal operating conditions of the boiler enables the detection of abnormal conditions (i.e., tube leaks). Because typical amounts of historical data used for model training (one year of data) often do not contain all combinations in operating parameters observed through the normal lifetime of a boiler, the present invention uses trailing adaptation algorithm described below to dynamically update the model when new combinations of operating parameters are encountered, and when the new data does not occur in the presence of a tube leak.

More than one model may be used to generate estimates as described with respect to FIG. 1. Models may be developed that focus on sections of the boiler in particular. In each case, the process of FIG. 1 is performed for each model.

Model Development

The first step in the invention is to construct suitable kernel-based models for a targeted boiler. Although the invention encompasses all forms of localized, kernel-based modeling techniques, the preferred embodiment of the invention utilizes the localized Similarity-Based Modeling (SBM) algorithm, which is detailed below.

The modeling process begins with the identification of all boiler sensors and collection of representative operating data from the sensors. Preferably, the set of sensors should encompass all process variables (pressures, temperatures, flow rates, etc.) used to monitor boiler operation. The set of sensors should include process variables from all major tube bundle regions (furnace, primary superheater, secondary superheater, reheater, economizer, boiler wall heat transfer region, etc.). If available, sensors that measure boiler make-up water or acoustically monitor boiler regions should be included in the set of sensors, since these are sensitive to tube leaks. Model development requires a sufficient amount of historic data to characterize normal operating conditions of the boiler. This condition is typically met by a year of operating data collected at a once-per-hour rate. Operation and maintenance records for the boiler are required to identify the location of any tube leaks that might have occurred during the selected operating period.

Following identification of boiler sensors and collection of operating data, the operating data are cleaned by data filtering algorithms. The data filtering algorithms test the suitability of data for model training; eliminating data for a variety of reasons including nonnumeric values, sensor drop-outs, spiking and flat-lining. Sensors that exhibit a preponderance of these effects can be easily eliminated from further modeling considerations and not included in any model. An important consideration in preparation of model training data is to eliminate data from time periods just prior to known past tube leak events so that the models recognize novel sensor behavior coincident with tube faults as being abnormal. The period of data eliminated prior to known tube leak events should preferably equal the maximum length of time that a boiler can operate with a tube leak. Experience has shown that eliminating one to two weeks of data prior to tube leak events is sufficient. Data that survive the filtering process are combined into a reference matrix of reference observations, each observation comprising a set of readings from each of a plurality of sensors in the model. The columns of the matrix correspond to sensor signals and the rows correspond to observation vectors (i.e., sensor measurements that are collected at the same point in time). Experience has shown that elimination of data by the filtering algorithms and due to concurrence with tube leak events results in typically half of the original data ending up in the reference matrix.

Sensors that are retained following the data filtering step are then grouped into candidate models. Sensors are grouped into candidate models based on plant location and function. An example candidate model might contain all sensors in a major boiler region. There is no upper limit on the number of sensors that can be included in an SBM. But because it is difficult to interpret sensor trends when models contain many sensors, a practical upper limit of about 150 to 200 sensors has been established. Sensors can be assigned to any number of candidate models and subgroups of related sensors can be included in any number of candidate models.

For each candidate model, training algorithms are applied that can effectively downsample the available historic data (which may be tremendously large) to a manageable but nonetheless representative set of reference data, which is identified herein as the model memory or H matrix. One effective training algorithm comprises selecting all reference vectors that contain a global maximum or minimum value for a sensor in the model. A remaining subset of available reference observations is then added. This can be done either by random selection, or by a using a distance metric of some kind to rate the remaining vectors and selecting one for inclusion at regular intervals. This can be done on an elemental basis or on a multidimensional basis. For example, after minimums and maximums have been covered, each reference vector available can be ranked according to the value of a given sensor, and then vectors included over intervals of the sensor value (e.g., each 5 degrees, or each 0.1 units of pressure). This can be done for one, some or all sensors in the model. This would constitute an elemental metric approach.

Once trained, the candidate models are tested against the remaining data in the reference matrix. The results (residual signals) from these tests are statistically analyzed to enable model grading. By directly comparing the statistics generated by the models, poorly performing candidate models can be eliminated and the best model for each boiler sensor can be identified. There are a number of statistics that are evaluated for each model, with the most important statistic being robustness. The robustness statistic is a measurement of the ability of the model to detect disturbances in each one of the modeled sensors. It is calculated by applying a small disturbance (step change) into the test signal for each modeled sensor. The tendency of the model estimate to follow the disturbance is evaluated by comparing the estimate calculated by the model over the disturbed region of the signal to the estimate calculated by the model when the disturbance is removed.

The residual signals from the best candidate models are further analyzed to determine the normal variation in model behavior. In this calculation, a normal residual signal is generated for each modeled sensor by a leave-one-out cross-validation algorithm applied to the H matrix. A statistical analysis of the normal residual signals measures upper and lower variation in normal residual response. Finally, these upper and lower values are multiplied by a user-specified factor, which typically varies between a value of 2 and 3, to set residual thresholds for each modeled sensor. The residual thresholds form the basis for distinguishing between normal and abnormal sensor behavior.

According to the present invention, the modeling technique can be chosen from a variety of known empirical kernel-based modeling techniques. By way of example, models based on kernel regression, radial basis functions and similarity-based modeling are usable in the context of the present invention. These methods can be described by the equation:

$$x_{est} = \sum_{i=1}^{L} c_i K(x_{new}, x_i) \quad (1)$$

where a vector $x_{est}$ of sensor signal estimates is generated as a weighted sum of results of a kernel function K, which compares the input vector $x_{new}$ of sensor signal measurements to multiple learned snapshots of sensor signal combinations, $x_i$. The kernel function results are combined according to weights $c_i$, which can be determined in a number of ways. The above form is an "autoassociative" form, in which all estimated output signals are also represented by input signals. This contrasts with the "inferential" form in which certain output signal estimates are provided that are not represented as inputs, but are instead inferred from the inputs:

$$\hat{y} = \sum_{i=1}^{L} c_i K(x_{new}, x_i) \quad (2)$$

where in this case, y-hat is an inferred sensor estimate. In a similar fashion, more than one sensor can be simultaneously inferred.

In a preferred embodiment of the invention, the modeling technique used is similarity based modeling, or SBM. According to this method, multivariate snapshots of sensor data are used to create a model comprising a matrix D of learned reference observations. Upon presentation of a new input observation $x_{in}$ comprising sensor signal measurements of equipment behavior, autoassociative estimates $x_{est}$ are calculated according to:

$$x_{est} = D \cdot (D^T \hat{x} D)^{-1} \cdot (D^T \hat{x} x_{in}) \quad (3)$$

or more robustly:

$$x_{est} = \frac{D \cdot (D^T \otimes D)^{-1} \cdot (D^T \otimes x_{in})}{\sum ((D^T \otimes D)^{-1} \cdot (D^T \otimes x_{in}))} \quad (4)$$

where the similarity operator is signified by the symbol $\hat{x}$, and can be chosen from a number of alternative forms. Generally, the similarity operator compares two vectors at a time and returns a measure of similarity for each such comparison. The similarity operator can operate on the vectors as a whole (vector-to-vector comparison) or elementally, in which case the vector similarity is provided by averaging the elemental results. The similarity operator is such that it ranges between two boundary values (e.g., zero to one), takes on the value of one of the boundaries when the vectors being compared are identical, and approaches the other boundary value as the vectors being compared become increasingly dissimilar.

An example of one similarity operator that may be used in a preferred embodiment of the invention is given by:

$$s = e^{-\frac{|x_{in} - x_i|}{h}} \quad (5)$$

where h is a width parameter that controls the sensitivity of the similarity to the distance between the input vector $x_{in}$ and the example vector $x_i$. Another example of a similarity operator is given by:

$$s = \frac{1}{N} \sum_{i=1}^{N} \left( \left[ 1 + \frac{[(_A x_i - _B x_i)/R_i]^\lambda}{C} \right]^{-1} \right) \quad (6)$$

where N is the number of sensor variables in a given observation, C and $\lambda$ are selectable tuning parameters, $R_i$ is the expected range for sensor variable i, and the elements of vectors $_A x$ and $_B x$ corresponding to sensor i are treated individually.

Further according to a preferred embodiment of the present invention, an SBM-based model can be created in real-time with each new input observation by localizing within the learned reference library to those learned observations with particular relevance to the input observation, and constituting the D matrix from just those observations. With the next input observation, the D matrix would be reconstituted from a different subset of the learned reference matrix, and so on. A number of means of localizing may be used, including nearest neighbors to the input vector, and highest similarity scores.

By way of example, another example-learning kernel based method that can be used to generate estimates according the invention is kernel regression, as exemplified by the Nadaraya-Watson equation (in autoassociative form):

$$\hat{x} = \frac{\sum_{i=1}^{L} d_i K(x_{new}, d_i)}{\sum_{i=1}^{L} K(x_{new}, d_i)} = \frac{D \cdot (D^T \otimes x_{new})}{\sum (D^T \otimes x_{new})} \quad (7)$$

which in inferential form takes the form of:

$$\hat{y} = \frac{\sum_{i=1}^{L} d_i^{out} K(x_{new}, d_i^{in})}{\sum_{i=1}^{L} K(x_{new}, d_i^{in})} = \frac{D_{out} \cdot (D_{in}^T \otimes x_{new})}{\sum (D_{in}^T \otimes x_{new})} \quad (8)$$

Localization again is used to preselect the reference observations that will comprise the D matrix.

Turning to the specific details of localization, a number of methods can be used to localize on the right subset of available reference observations to use to constitute the D matrix, based on the input observation for which the estimate is to be generated. According to a first way, the nearest neighbors to the input observation can be used, as determined with a number of distance metrics, including Euclidean distance. Reference observations can be included based on nearest neighbor either (a) so that a requisite minimum number of reference observations are selected for inclusion in the D matrix, regardless of how distant the furthest included observation is, or (b) so that all reference observations within a selected distance are included, no matter how many or few there are.

According to another way of localizing, the kernel similarity operator K itself is used to measure the similarity of every available reference vector or observation, with the input observation. Again, either (a) a requisite number of the most similar reference observations can be included, or (b) all reference observations above a threshold similarity can be included.

According to a variation of the above, another way of choosing reference vectors for the D matrix can include the above distance and similarity approaches, coupled with the criteria that the D matrix must contain at least enough reference vectors so that each sensor value of the input observation is bracketed by a low and a high sensor value from the reference observations, that is, so that the input observation does not have a sensor value that is outside the range of values seen for that sensor across all the reference observations that have been included in the D matrix. If an input sensor is out of range in this sense, then further reference vectors are added until the range for that sensor is covered. A minimum threshold of similarity or distance can be used such that if no reference vector with at least that similarity, or at least within that distance, is found to cover the range of the sensor, then the D matrix is used as is, with the input observation sensor lying outside the covered range.

The basic approach for modeling of a boiler, as discussed herein, is to use one model to monitor boiler performance and a number of other models to monitor various tube bundle regions, such as the primary superheater, secondary superheater, reheater, furnace waterwall and economizer sections.

The boiler performance model is designed to provide the earliest indications of developing tube leaks by detecting subtle deviations in boiler performance induced by the tube leaks. The main constituents of the boiler performance model are the sensors that monitor the input and output conditions of both the fuel/air side and water/steam sides of the boiler. On the fuel/air side of the boiler, these include sensors that measure the flow of fuel and air into the furnace section of the boiler and the flow of air and combustion products out of the boiler to the plant's stack. On the water/steam side, these include sensors that measure the flow of feedwater into the first heat transfer section of the boiler (typically the economizer) and all flows of saturated and superheated steam out of the boiler leading to various turbine stages. In addition, sensors that measure the energy content of these flows, such as power expended by system pumps and the power generated by the plant are included in the model. Conceptually, the boiler performance model is constructed of the constituent elements in mass and energy balances across the fuel/air and water/steam components of the boiler. Since the model is trained with data collected while the boundary between the two sides is intact, the model is designed to detect changes in the mass and energy balances when the boundary between the two sides is breached by boiler tube leaks.

Experience with the boiler performance model during boiler tube faults has revealed that key boiler sensors that show deviations correlated with tube leaks include: air flows, forced and induced draft pump currents, outlet gas pressures and temperatures, excess (i.e., uncombusted) oxygen fractions and steam drum levels and temperatures. Most of the boiler model sensors that provide early warning monitor the flow of air and combustion products through the boiler. The effect of tube leaks on water/steam side parameters tend to show up in the later stages of the fault progression.

The heat transfer regions of the boiler are typically composed of tube bundles, with high pressure steam/water mixture on the inside of the tubes and hot air/combustion product mixture on the outside. The number and composition of the heat transfer models depends upon the boiler design and the installed instrumentation. The bulk of sensors included in the models are thermocouples that monitor the temperature of the steam/water mixture within individual tubes. For better instrumented boilers, the number of tube bundle thermocouples can easily run into the hundreds. For the most part, these tube bundle thermocouples are located outside of the heat transfer region, away from the caustic air/combustion product mixture, and are located near the tops of the tubes where they connect with steam headers.

Residual Signal Analysis for Rule Development

After development of a set of models for a targeted boiler, all historic data collected from the boiler are analyzed. These calculations include any data prevented from the being added to the reference matrix by the data filtering algorithms or due to concurrence with tube leak events. In the event that an observation vector contains nonnumeric data values, the autoassociative form of the model can be switched to an inferential form of the model for the missing sensor value. These calculations produce residual signals that bear signatures of boiler tube leaks.

The residual signals generated during the modeling of all collected operating data are analyzed to detect sensor abnormalities. The first step in residual signal analysis is to apply linear or nonlinear windowed-smoothing algorithms (e.g., moving average, median and olympic filters) to accentuate residual signal deviations. Next, smoothed and unsmoothed residual signals are analyzed with the residual threshold alerting and window ratio rule algorithms. These algorithms provide simple means to detect the onset and measure the persistence of sensor abnormalities. Other sensitive statistical techniques, including the sequential probability ratio test and run-of-signs tests can be used to provide additional means of detecting onset and measuring persistence of sensor abnormalities. For residual signals that display deviations, one-dimensional kernel techniques, including kernel regression and SBM regression algorithms, are used to calculate the rate-of-change of the deviations.

The residual signal analysis provides a database of time-varying measurements that can be used to characterize the tube leak faults. These measurements include time of onset, direction of deviation (i.e., negative or positive), duration, amplitude and rate-of-change for all sensors that exhibit residual signal abnormalities. Utilizing maintenance records, the residual signals and time-varying measurements can be recast as functions relative to the time at which the tube leak is detected or time at which the boiler is shutdown to repair the leak. Collectively, the residual signals and measurements form a set of residual signal signatures for each boiler fault.

Utilizing maintenance records and knowledge of boiler design and boiler fault mechanisms to group similar tube leak events, the residual signal signatures are reviewed to identify the salient characteristics of individual fault types. An important aspect of this task is to review operational records to determine whether any of the residual signal signatures can be explained by changes in operation that were not captured during the training process. Because of the high-dimensionality of the residual signal signatures, classification algorithms, such as K-means, LVQ neural network and SBM classification algorithms can be used to reveal common features hidden within the residual signal signatures that may escape expert review. Salient residual signal features that are identified for a given fault type are cast into diagnostic rules to provide a complete boiler tube fault solution.

An important application of the heat transfer models constructed to monitor tube bundle sections of the boiler, as discussed herein, is to merge model results with data defining the physical location of tube bundle thermocouples to infer the location of tube leaks. Merging of these data allows for the development of intuitive visual interfaces.

Figure 2:
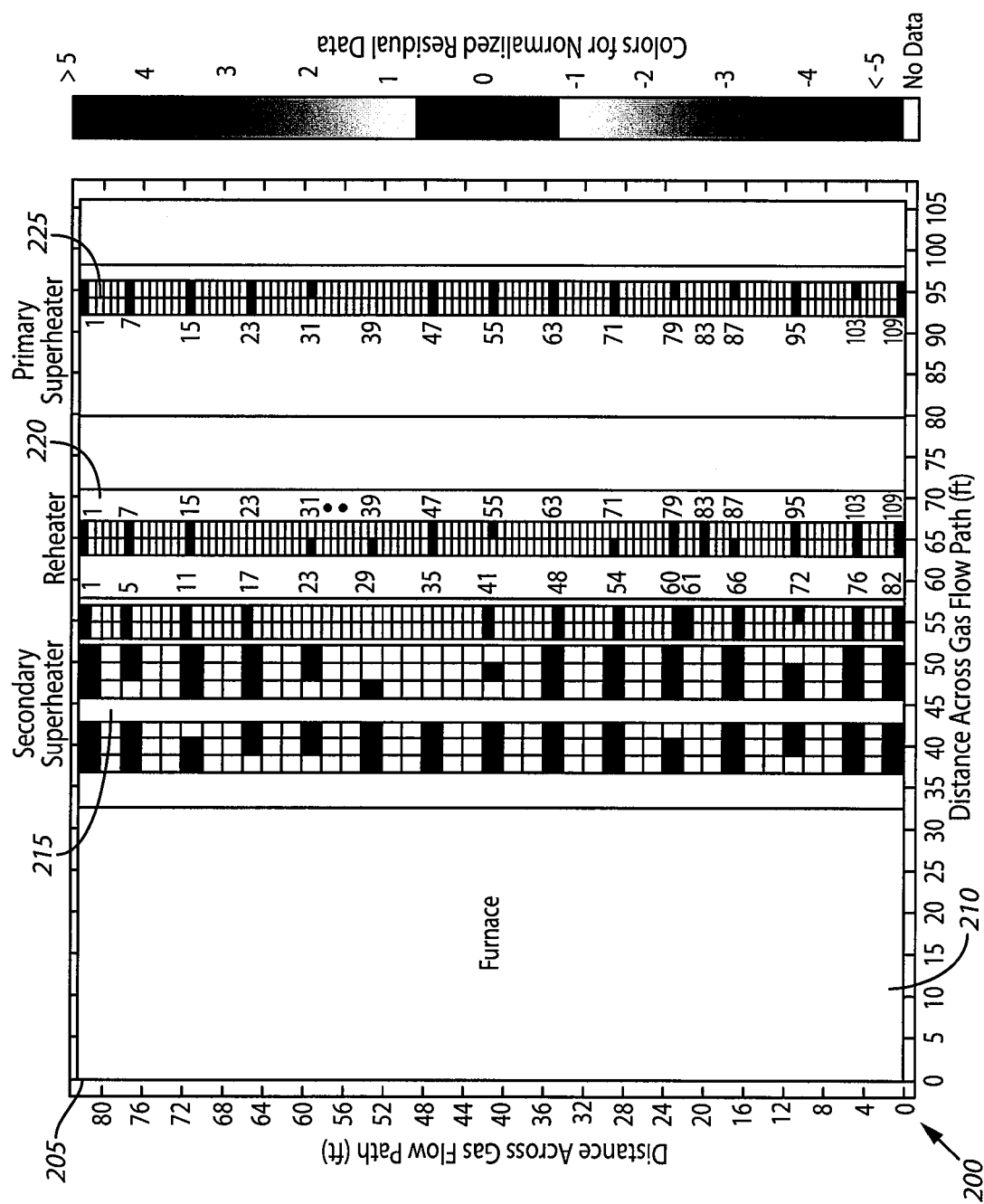
FIG. 2 illustrates an intuitive visual interface according to an embodiment of the invention.

FIG. 2 illustrates an intuitive visual interface 200 according to an embodiment of the invention. The visual interface 200 may be displayed on a computer monitor or on some other type of display viewable by an operator. FIG. 2 represents a birds-eye view of a boiler 205, looking from the highest region of the boiler 205, called the penthouse, down into the heat transfer sections of the boiler 205. The left-side of the figure labeled "furnace" 210 represents the combustion zone of the boiler 205. Hot combustion gases rise from the furnace 210 and are redirected horizontally across the tube bundle regions where they heat the water/steam mixture in the tubes. As represented by the figure, the hot combustion gases flow from left-to-right, passing through the secondary superheater 215, reheater 220, and then primary superheater 225 sections, in turn. These sections are labeled along the top of the figure and are represented by gray shaded regions within the figure. Embedded within these regions are rectangular grids which are used to roughly represent the location of the various tube bundle thermocouples. The numbers that are arrayed vertically along the sides of the rectangular grid indicate pendant numbers. A pendant is a collection of steam tubes that are connected to a common header. For the boiler 205 represented in the figure, a pendant contains from 22 to 36 individual tubes, depending on tube bundle region. Within a particular pendant, two or three of the steam tubes may contain thermocouples. Pendants that contain tubes monitored by thermocouples are indicated by colors that vary from red to blue. Pendants that lack tube thermocouples or whose thermocouple(s) are inoperable are represented by white rectangles in the grids.

The colors are used to indicate the value of the normalized residual produced by the model of a thermocouple at a given moment in time. Residual values for a thermocouple are normalized by a statistical measure of the normal amount of variation in the model for that thermocouple. The relationship between individual shades of color and corresponding normalized residual values is depicted by the vertical color bar located to the right of the figure.

The results depicted in FIG. 2 were generated for a boiler 205 that experienced boiler tube leaks in its reheater 220. The figure shows normalized residual signals for tube bundle thermocouples for a time that was six hours prior to the time at which the operator suspected that a tube fault event had occurred and initiated a boiler 205 shutdown. Following shutdown of the boiler 205, maintenance personnel inspected all tube bundle regions of the boiler and discovered that two reheater steam tubes, one in pendant 33 and the other in pendant 35, had failed. The location of the pendants which contained the failed tube is depicted by two solid black dots. FIG. 2 shows that thermocouples situated closest to the failed steam tubes exhibit the largest residual signal changes. The two thermocouples located in pendant 39 of the reheater are shaded to indicate that the normalized residuals for these sensors have shifted in the positive direction. The one operable thermocouple in pendant 31 of the reheater is shaded differently to indicate that its residual has shifted negatively to a large degree.

FIG. 2 shows that steam tubes located to the right of the failed tubes across the combustion gas flow path are experiencing higher temperatures than those expected by the model, while steam tubes located to the left of the failed tubes are experiencing lower temperatures than those expected by the model. These changes in temperature profile are due to the directional nature of the tube failure. In most cases, tube failures are characterized by a small opening in the tube or by a tear along the length of the tube. Rarely does the opening extend around the circumference of the tube. Thus the high pressure steam tends to escape from the leak preferentially in one direction. Since the high pressure steam flowing from the failed tube is cooler than the surrounding combustion gases, steam tubes along the direction of the leak are cooled. The high pressure steam disturbs the normal flow of the combustion gases, forcing the gases to the other side of the tube fault heating the steam tubes on the opposite side of the leak. The normalized residual values for thermocouples located relatively far from the failed tubes are within the bounds of normal model variation, and thus are depicted by shaded rectangles in the grids of FIG. 2.

Adaptation

Because typical amounts of historical data used for model training do not necessarily contain all combinations in operating parameters observed through the normal lifetime of a boiler, the real-time monitoring solution is preferably coupled with a means to maintain model accuracy, by application of various adaptation algorithms, including manual (user-driven), trailing, out-of-range, in-range and control-variable driven adaptation algorithms. In manual adaptation, the user identifies a stretch of data which has been validated as clear of faults, and that data is added to the repertoire of reference data from which the H matrix is then reconstituted. In out-of-range adaptation, observations that contain new highs or lows for a sensor, beyond the range of what was seen across all the available reference data, is added to the reference data (and optionally after validating no fault is occurring at the time) and the H matrix is instantly or occasionally reconstituted. Alternatively, the new observation can be added directly to the H matrix. In control variable driven adaptation, observations corresponding to new control settings not used during the time frame of the original reference data are added to the reference data, and the H matrix is reconstituted. In in-range adaptation, observations falling into sparsely represented spaces in the dimensional space of the model are added to the reference data upon determination that no fault was occurring during that observation. The preferred embodiment uses the trailing adaptation algorithm (detailed below) coupled with manual adaptation as needed.

In the trailing adaptation algorithm, historical data that lag the data currently being analyzed are continually added to the H matrix and thus are available for future modeling. The trailing adaptation algorithm applies the same data filtering algorithms used during model development to test the suitability of trailing data encountered during monitoring. This prevents bad data (nonnumeric values, sensor drop-outs, spiking and flat-lined data) from being added to the H matrix. To apply the trailing adaptation algorithm the user needs to set the lag time, set the maximum size on the H matrix, and determine how to remove data from the H matrix when the maximum size is reached. The lag time is set to the maximum length of time that a boiler can operate with a tube leak, which typically equals one to two weeks. The maximum H matrix size is set based on balancing adequate model response with algorithm performance (CPU time). Experience has shown that a maximum H matrix size of 1000 observation vectors provides a good balance between model accuracy and algorithm performance. The preferred method for removing data from the H matrix is to remove the oldest observation vectors from the matrix. Other techniques based on similarity can be used in the alternative (i.e., remove the vector most similar to the current observation vector, remove the vector least similar to all other vectors in H, etc.)

The trailing adaptation algorithm continually adjusts the kernel-based localized model to maintain model accuracy, despite varying operating conditions. Because the trailing adaptation algorithm works in a delayed manner, gross changes in operating conditions such as resetting of baseline power level can cause residual signal signatures that are misinterpreted by the diagnostic rules. To ameliorate this effect, the manual adaptation algorithm is used to provide immediate model adjustment when gross changes in operating conditions are observed. In the manual adaptation algorithm, the user identifies the time at which the gross change in operating conditions is first observed. The algorithm then collects all recently analyzed data from that time up to the current time, passes the data through the same data filtering algorithms used during model development, and adds the remaining data to the H matrix. Another aspect of the manual adaptation algorithm is that it can be used to prevent automatic model adjustment by the trailing adaptation algorithm when abnormal changes in operating conditions are observed. For instance when a boiler tube leak occurs, the user specifies the period of recently collected data that corresponds to the leak and identifies the data as being unsuitable for consideration by the trailing adaptation algorithm. This is accomplished by the simple setting of a binary flag that is attached to each observation vector processed by the system. When the trailing adaptation algorithm encounters these vectors, the algorithm reads the binary flags and prevents the vectors from being added to the H matrix.

Because the trailing and manual adaptation algorithms continually modify the H matrix to capture changing operating conditions, the residual thresholds need to be recalculated occasionally. Since the thresholds are a function of the statistical width of normal residual signals generated from the H matrix, the thresholds need to be recalculated only when a sizable fraction (e.g., 10%) of the H matrix is replaced.

Example

Figure 3:
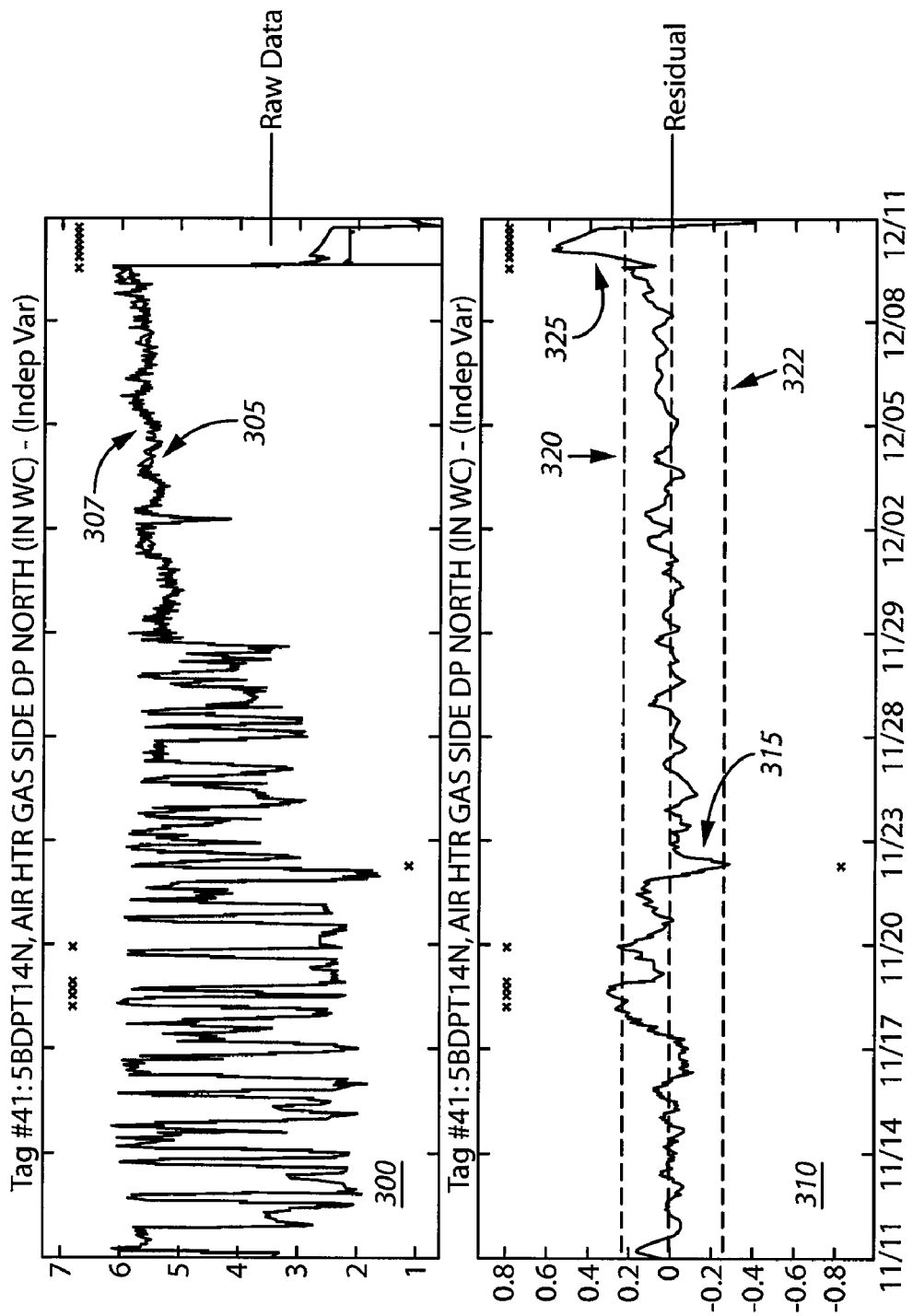
FIG. 3 shows a pair of related signal plots, as generated according to the invention, for a portion of a boiler which did not have a boiler tube leak.

Turning to FIG. 3, two plots are shown. A first plot 300 shows the raw data 305 and the corresponding model estimate 307 of a pressure drop sensor from a boiler in an air heater section. The difference between the raw data 305 and the estimate 307 is the residual 315 which is shown in the bottom plot 310. The residual 315 is tested against statistically determined upper and lower thresholds 320 and 322 respectively.

As can be seen, the estimate 307 and the raw data 305 are very close, and the residual 315 is well behaved between thresholds 320 and 322 until late in the plots, where a residual exceedance 325 is seen corresponding to a shut down of the boiler for repair. The model of the invention found no problem with this portion of the boiler.

Figure 4:
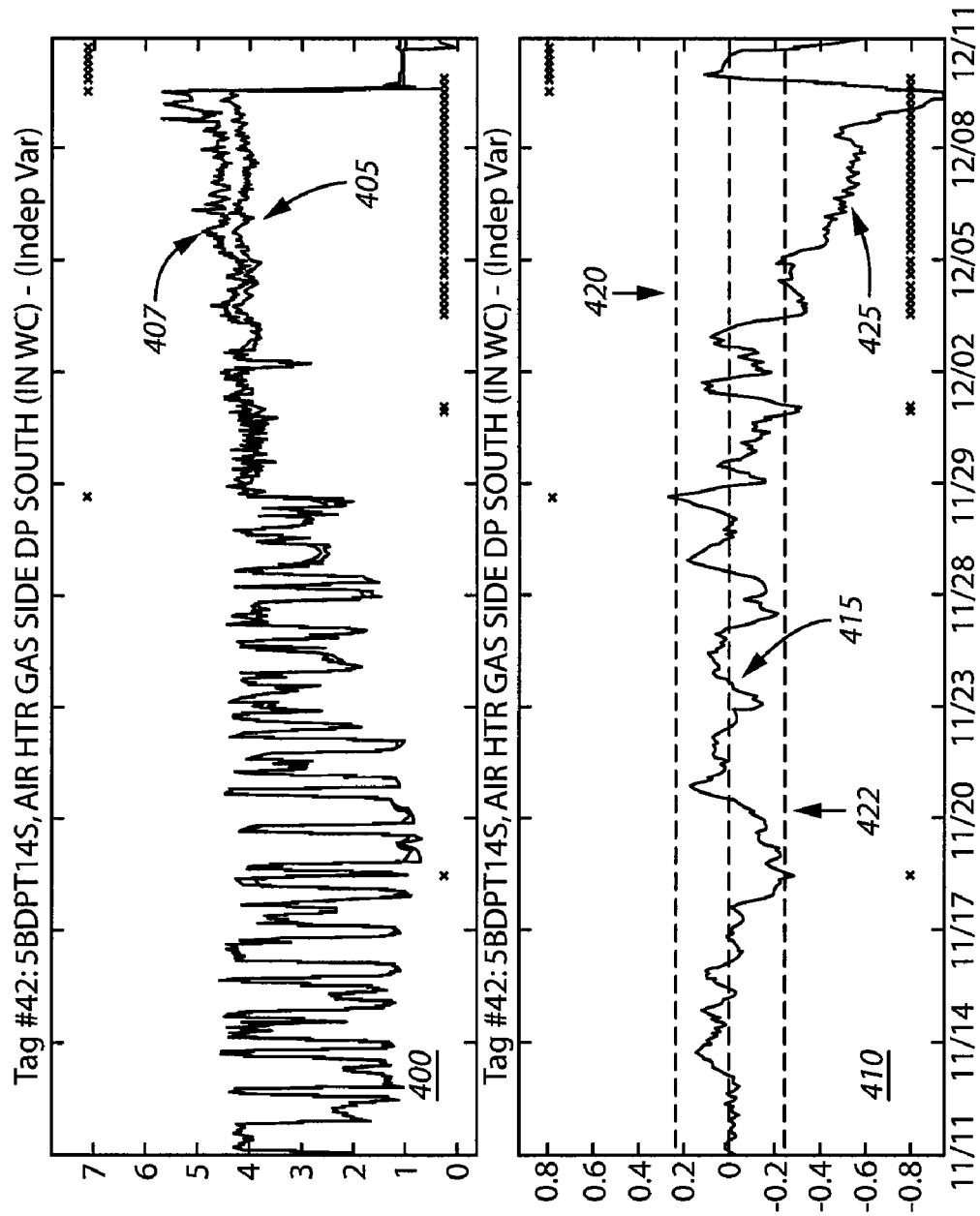
FIG. 4 shows a pair of related signal plots, as generated according to the invention, for a portion of the same boiler, which did have a boiler tube leak.

Turning to FIG. 4, a corresponding parallel air heater section of the boiler of FIG. 3 is shown, again with two plots. The top plot 400 shows the raw data 405 and the corresponding model estimate 407 of a pressure drop sensor from a boiler in this parallel air heater section to that shown in FIG. 3. The difference between the raw data 405 and the estimate 407 is the residual 415 that is shown in the bottom plot 410. The residual 415 is tested against statistically determined upper and lower thresholds 420 and 422 respectively. As can be seen, the estimate 407 and the raw data 405 deviate over time, with raw data 405 moving lower than was expected according to estimate 407. Correspondingly, the residual 415 exceeds lower threshold 422 further and further leading up to the shut down of the boiler for repair. The deviation 425 shown here evidences the boiler tube leak that led to the shut down of the boiler.

Figure 5:
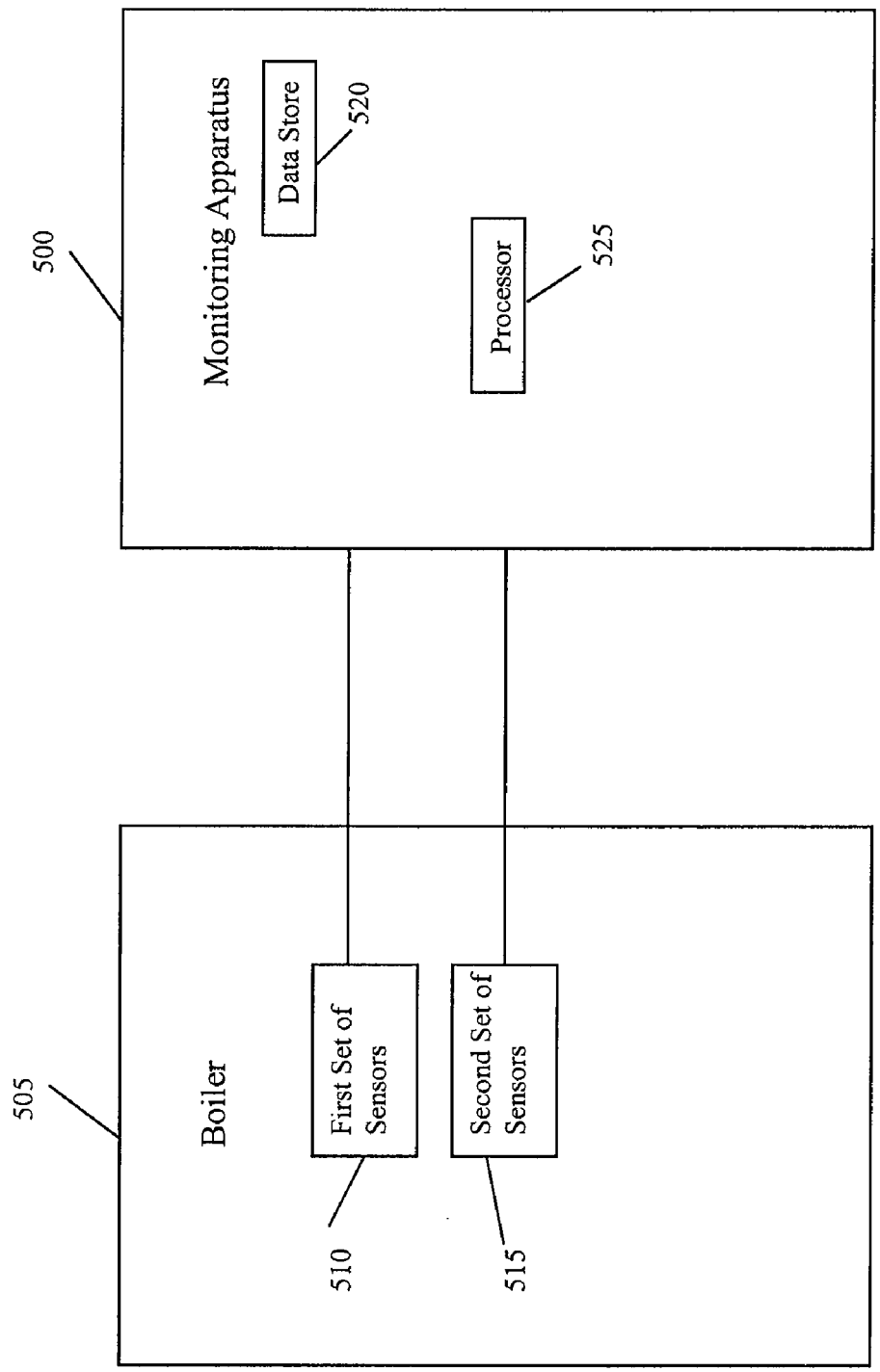
FIG. 5 illustrates a monitoring apparatus for diagnosing faults in a system according to an embodiment of the invention.

FIG. 5 illustrates a monitoring apparatus 500 for diagnosing faults in a system according to an embodiment of the invention. As shown, the monitoring apparatus monitors a boiler 505 for faults. Sensors are utilized to monitor the boiler 505. A first set of the sensors 510 monitors conditions of the fuel/gas mixture of the boiler 505. A second set of the sensors 515 monitors conditions of the water/steam mixture of the boiler 505. The conditions being monitored by the first set of sensors 510 and the second set of sensors 515 include pressures, temperatures, and flow rates.

The monitoring apparatus 500 includes a reference data store 520 containing instrumented data corresponding to the boiler 505. The monitoring apparatus 500 also includes a processor 525 to (a) construct an empirical model for the targeted component of the system according to a nonparametric kernel-based method trained from example observations of sensors monitoring the system; (b) generate substantially real-time estimates based on the instrumented data corresponding to the targeted component; (c) compare and difference the substantially real-time estimates with instrumented readings from the sensors to provide residual values; and (d) analyze the residual values to detect the faults and determine a location of the faults in the monitored system.

Teachings discussed herein are directed to a method, system, and apparatus for diagnosing faults in a system monitored by sensors. An empirical model is constructed for a targeted component of the monitored system. The empirical model is trained with an historical data source that contains example observations of the sensors. Substantially real-time estimates are generated based on instrumented data corresponding to the targeted component. The substantially real-time estimates are compared and differenced with instrumented readings from the sensors to provide residual values. The residual values are analyzed to detect the faults and determine a location of the faults in the monitored system. At least one inferred real-time estimate may be generated based on data corresponding to the targeted component comprises.

The empirical model may be utilized to generate estimated sensor values according to a nonparametric kernel-based method. The empirical model may further generate estimated sensor values according to a similarity-based modeling method or a kernel regression modeling method.

The empirical model may be updated in real-time with each new input observation localized within a learned reference library to those learned observations that are relevant to the input observation.

The empirical model may implement an adaptation algorithm to learn new normal variation patterns in operation of the monitored system. The adaptation may utilize at least one of: lagging-window, manual (user-driven), trailing, out-of-range, in-range, and control-variable driven adaptation algorithms.

A first set of the sensors may be utilized to monitor fuel/gas conditions of the boiler, and a second set of the sensors to monitor water/steam conditions of the boiler. The targeted component may be a boiler of a fossil fueled power plant environment.

Some embodiments described above include a boiler in a fossil fuel power plant. However, those skilled in the art will recognize that the targeted component may instead be the steam generator of a nuclear power plant. In such case, the first set of sensors would monitor high pressure water conditions of the primary side of a nuclear power plant steam generator. In general, the first set of sensors utilized by the method discussed herein monitors the "hot side conditions" of steam generating equipment. The "hot side" contains the fluid that transfers thermal energy from the power source. The power source is the reactor core of a nuclear power plant or the combustion region of a fossil fuel plant.

A visual interface may be provided to graphically display components of the steam generating equipment and indicate residual values for locations of thermocouples within the tube bundle sections of the steam generating equipment.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method of diagnosing faults in a monitored system, the monitored system being monitored by sensors, comprising:
   constructing an empirical model for a targeted component of the monitored system, wherein the empirical model is trained with a historical data source that contains example observations of the sensors;
   generating substantially real-time estimates based on instrumented data corresponding to the targeted component;
   comparing and differencing the substantially real-time estimates with instrumented readings from the sensors in the form of input observations to provide residual values;
   analyzing the residual values to detect the faults and determine a location of the faults in the monitored system; and
   adapting, by a processor, the empirical model with input observations indicating normal operation of the monitored system only after a predetermined time period from acquiring each such input observation.

2. The method of claim 1, wherein the targeted component consists of steam generating equipment which contains a first set of sensors to monitor hot side conditions of steam generating equipment and a second set of the sensors to monitor steam/water conditions of the steam generating equipment.

3. The method of claim 2, further comprising determining the location of a tube leak by graphically displaying, on a visual interface, a representation of one or more components of the steam generating equipment and the locations of tubes within one or more of the components, and indicating residual values at the representation of physical locations of sensors that correspond to the residual values, the sensors measuring the temperature near tubes at different locations within the one or more components.

4. The method of claim 3 wherein the sensors comprise tube-bundle thermocouples.

5. The method of claim 2, wherein the steam generating equipment is a boiler of a fossil-fuel power plant.

6. The method of claim 2, wherein the steam generating equipment is a steam generator of a nuclear power plant.

7. A method of claim 1, wherein the empirical model generates estimated sensor values according to a nonparametric kernel-based method.

8. A method of claim 7, wherein the empirical model generates estimated sensor values according to a similarity-based modeling method.

9. A method of claim 7, wherein the empirical model generates estimated sensor values according to a kernel regression modeling method.

10. The method of claim 1, wherein adapting corriprises having the empirical model implement an adaptation algorithm to learn new normal variation patterns in operation of the monitored system.

11. The method of claim 10, wherein the adaptation algorithm utilizes at least one of: manual (user-driven), trailing, out-of-range, in-range, and control-variable driven adaptation algorithms.

12. The method of claim 1, wherein the empirical model is updated to form a subset of the example observations and in real-time with each new input observation localized within a learned reference library to those example observations that are relevant to the input observation, according to predetermined relevance criteria.

13. The method of claim 1, wherein the generating substantially real-time estimates based on data corresponding to the targeted component comprises generating at least one inferred real-time estimate.

14. The method of claim 1, wherein the predetermined time period is set to at least the amount of time the system being monitored can still operate with a known fault.

15. The method of claim 3 wherein the representation is a grid with columns and rows, and wherein squares formed by the grid represent a bundle of tubes.

16. A monitoring apparatus for diagnosing faults in a system monitored by sensors, comprising:
    a reference data store containing instrumented data corresponding to a targeted component of the system;
    a processor to
       construct an empirical model for a targeted component of the monitored system, wherein the empirical model is trained with a historical data source that contains example observations of the sensors;
       generate substantially real-time estimates based on the instrumented data corresponding to the targeted component;
       compare and difference the substantially real-time estimates with instrumented readings from the sensors in the form of input observations to provide residual values;
       analyze the residual values to detect the faults and determine a location of the faults in the monitored system; and
       adapt the empirical model with input observations indicating normal operation of the system only after a predetermined time period from acquiring each such input observation.

17. The monitoring apparatus of claim 16, wherein the processor constructs an empirical model to generate estimated sensor values according to a nonparametric kernel-based method.

18. The monitoring apparatus of claim 17, wherein the processor constructs an empirical model to generate estimated sensor values according to a similarity-based modeling method.

19. The monitoring apparatus of claim 17, wherein the processor constructs an empirical model to generate estimated sensor values according to a kernel regression modeling method.

20. The monitoring apparatus of claim 16, further comprising a visual interface to graphically display a representation of the physical location of components of the targeted component and indicate residual values at the physical locations of sensors that correspond to the residual values and on the representation.

21. The monitoring apparatus of claim 20 wherein the sensors comprise tube-bundle thermocouples.

22. The monitoring apparatus of claim 20 wherein the representation is a grid with columns and rows, and wherein squares formed by the grid represent a bundle of tubes.

23. The monitoring apparatus of claim 16, wherein the processor adapts by constructing an empirical model that implements an adaptation algorithm to learn new normal variation patterns in operation of the system.

24. The monitoring apparatus of claim 23, wherein the adaptation algorithm utilizes at least one of: manual (user-driven), trailing, out-of-range, in-range, and control-variable driven adaptation algorithms.

25. The monitoring apparatus of claim 16, wherein the processor constricts an empirical model that is updated to form a subset of the example observations and in real-time with each new input observation localized within a learned reference library to those example observations that are relevant to the input observation, according to predetermined relevance criteria.

26. The apparatus of claim 16, wherein the predetermined time period is set to at least the amount of time the system being monitored can still operate with a known fault.

27. A method for characterizing tube leak faults in a monitored system, comprising:
   collecting historical sensor data for a targeted component of the monitored system;
   producing residual signals that are correlative of given tube leak fault types in the targeted component;
   analyzing the residual signals to generate residual signal signatures according to at least one predetermined analysis algorithm;
   collecting the residual signal signatures in a database of time-varying measurements;
   analyzing, by a processor, the database of residual signal signatures according to at least one predetermined classification algorithm to characterize salient features of the residual signal signatures relating to the given tube leak fault types, and
   determining the location of a tube leak at a particular tube by providing, on a visual interface, a graphical display of a representation of the physical location of tubes within the targeted component and indicating residual values at a representation of the physical location of sensors corresponding to the residual values and on the display, the sensors being disposed and arranged to measure the temperature at a plurality of locations near different tubes located within the targeted component.

28. The method of claim 27, wherein the at least one predetermined analysis algorithm comprises at least one of residual threshold alerting, window ratio rule, sequential probability ratio test, and run-of-signs algorithms.

29. The method of claim 27, wherein the at least one predetermined classification algorithm comprises at least one of K-means, LVQ neural network, and SBM classification algorithms.

30. The method of claim 27 wherein the sensors comprise tube-bundle thermocouples.

31. The method of claim 27 wherein the representation is a grid with columns and rows, and wherein squares formed by the grid represent a bundle of tubes.

32. A method of monitoring a system, comprising:
   collecting historical sensor data for a component of the monitored system;
   generating estimate values by using the historical sensor data;
   producing residual values that indicate a difference between the estimate values and current input values;
   analyzing the residual values to determine if a particular type of fault exists; and
   determining the location of the part on the system that caused the fault by providing a graphical display, on a visual interface, of a representation of the physical location of the parts of the system being monitored, and a representation of residual values at a moment in time and on the graphical display, each residual value being represented at the physical location of a sensor on the display and corresponding to the residual value.

33. The method of claim 32 wherein the system is a steam generating system, and wherein the parts are tubes within a system component, and wherein the sensors are disposed and arranged to measure the temperature at a plurality of locations near different tubes located within the system component.

34. The method of claim 33 wherein the representation is a grid with columns and rows, and each square formed by the grid represents a bundle of tubes.

35. The method of claim 32 wherein the location with a sensor changes in color to indicate the amount of the residual value at that location.

36. The method of claim 32 wherein the residual values are generated by using similarity based modeling wherein the estimate values are generated by using a calculation that uses both the historical sensor data and the current input values.

* * * * *

UNITED STATES PATENT AND TRADEMARK OFFICE
CERTIFICATE OF CORRECTION

| | | |
|---|---|---|
| PATENT NO. | : 8,275,577 B2 | Page 1 of 1 |
| APPLICATION NO. | : 11/856897 | |
| DATED | : September 25, 2012 | |
| INVENTOR(S) | : Herzog | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 813 days.

Signed and Sealed this
Twelfth Day of August, 2014

Michelle K. Lee
*Deputy Director of the United States Patent and Trademark Office*